United States Patent Office 2,972,782
Patented Feb. 28, 1961

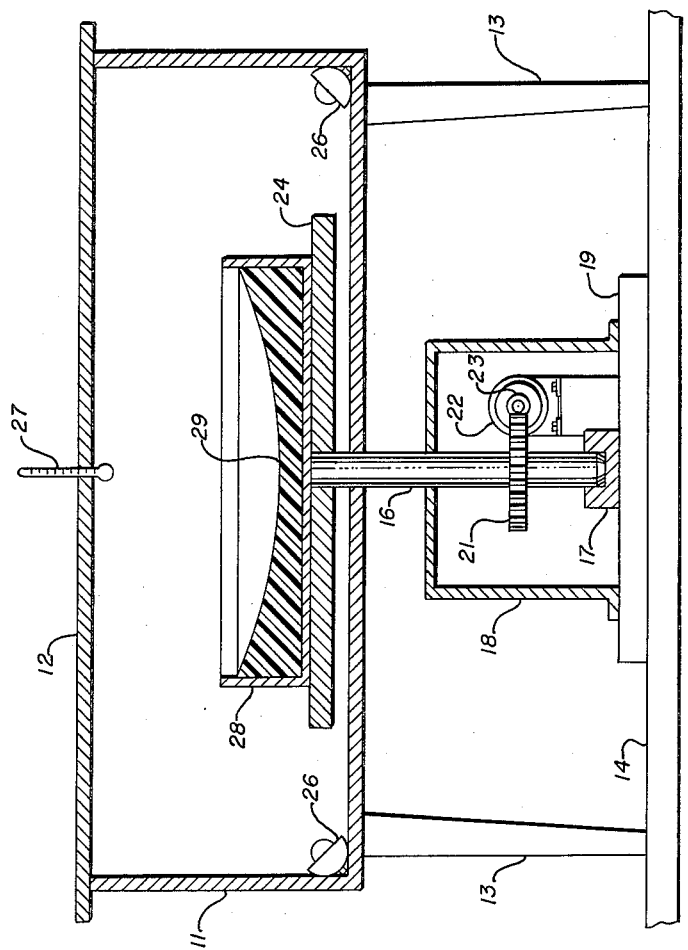

2,972,782
PROCESS FOR THE MANUFACTURE OF REFLECTOR BACKINGS

Paul B. Archibald, Livermore, Calif. (659 Bonita Ave., Pleasant, Calif.), assignor of twenty-five percent to Dominick Nardelli, Castro Valley, Calif.

Filed Dec. 16, 1957, Ser. No. 702,915

1 Claim. (Cl. 18—58.3)

This invention relates to a process for manufacturing highly accurate mathematical surfaces, such as paraboloids by casting epoxy resin.

Heretofore in the art, highly accurate surfaces that were paraboloids or planes, as used in reflectors, have been manufactured by various processes that are either tedious and costly, or quick and inexpensive and the reflectors thereby produced are characterized by being of either very high optical quality or very low. For example, optical mirrors are generally produced by slowly grinding and polishing individual blocks of glass or other fine grained material, a large part of the manufacturing time being consumed in checking for and insuring accuracy of form in the parabolic or plane surface desired. If high optical qualities were not required the pieces were either stamped or cast. One of the methods used to cast a paraboloid was to spin a pool of melted material on a vertical axis. As the material was thus revolved, it is cooled and solidified. A predetermined paraboloid surface was thus produced. The focal length of the paraboloid conforming to the mathematical formula:

$$f = \left(\frac{38.8}{R}\right)^2$$

$f$ is the focal length in feet
38.8 is a gravitational constant irrespective of the material used
$R$ is the rotational speed in revolutions per minute It is known in the art that when materials cool and change from one physical state to another the transition is not uniform and gradual. Localized point solidification has to occur in the liquid on which the crystal structure of the solid may grow. Thus it is observed that the surface of the casting, which was exposed to air, is very rough and has a dull appearance to the eye not of the quality that one may think reflectors may be made from.

The present invention provides an inexpensive and novel method and with the use of a novel material that does not go through transition from one physical state to another by physical means, but the transition from one physical state to another is by chemical means, and gradual. Therefore when that material sets, the surface exposed to air is a mathematical correct surface having a high gloss. In essence, the method and material consist of placing a liquid commonly known in the chemical art as "epoxy resin" in a pan or dish, and of rotating the dish about a central point for an extended period of time in order that the epoxy resin may transform chemically into a solid state, thus producing a paraboloid. An optical flat is produced by continuously tilting the pan up and down gradually. This method being a casing process, the surface exposed to air is referred to as a "cast surface."

It is therefore an object of the present invention to provide a new and improved inexpensive accurate optical surface.

Another object of the invention is to provide a direct process method for producing true concave paraboloidal surfaces.

A further object of the invention is to provide an inexpensive parabolic mirror backing having a smooth and fine grain finish, and a true paraboloidal form in the reflector mounting surface thereof.

A still further object of the invention is to provide a true surface that can be directly plated by a specular material into a "mirror" finish.

Other objects and advantages of the invention will be apparent from the following description and claims considered together with the accompanying drawing, in which is shown a sectional elevation of the assembly of the equipment required for the process.

Referring now to the drawing, there is shown a curing box 11, having a lid 12, and mounted upon legs 13, by which it is raised above the floor 14. A vertical turntable shaft 16 is disposed rotatably transpiercing the bottom of the box 11 and is mounted by its lower end in a thrust bearing 17, with a U-shaped bracket bearing 18 for support, both bearings being mounted on base block 19, which rests upon the floor. Below the box is a drive gear 21, secured radially to the shaft 16, and driven by an electric motor 22, and worm gear 23. Inside the box, a turntable 24 is mounted horizontally upon the end of the shaft 16. Heating lamps 26 are disposed about the interior of the box, and the box is lined with reflecting foil to retain the heat. A thermometer 27, mounted transpiercing the lid 12 of the box so as to continuously measure the interior temperature, is readable from the exterior. In operating the invention, a pan 28, partly filled with epoxy resin 29, in liquid form, is placed centrally upon the turntable which is then set in motion by the motor 22. The speed of revolution is adjusted to a predetermined value; the heating lamps 26 are activated to produce a predetermined temperature and the box is closed for a period sufficient to provide curing of the resin to a solid state. It will be understood that the rotation of the turntable produces a parabolic distortion in the surface of the liquid resin, since the mass of the liquid tends to gravitate toward the periphery of revolution, and this distortion is cured permanently into the hardened resin.

The following materials and refinements of technique have been found to be eminently suitable for the practice of the process in the preferred embodiment of the invention.

An epoxy resin consisting of Epon 828 as manufactured by the Shell Chemical Corporation, with 5% piperidine added as a catalyst, has been successfully employed. This material exhibits a quality of minimum shrinkage during the curing process. Distortions produced by shrinkage may therefore be eliminated quite easily by curing a basic backing piece about one-half inch in thickness at the central point and by then adding and individually curing one or two surfaces of about three mm. thickness. In producing particularly large backings, it is necessary to pay some attention to the cooling process to prevent cracking of the backing under internal stresses. (In this connection, polyester resins have been found to be generally unsatisfactory because of a high tendency to shrink on curing.) The most satisfactory curing temperature has been about 80° C. and curing time about six hours. Reflector backings, both plane surfaces and paraboloidal surface using epoxy resins as the base material, were made with surface tolerances within 50 millionths of an inch of a true mathematical surface. Some backings had the qualities of ground and polished mirrors.

It has also been observed in the invention that by applying a means of agitating or stirring of the epoxy resin as it gradually transforms from the liquid to the plastic and finally to the solid, a more accurate casting surface is thus produced. The explanation of this phenomenon may be that as the epoxy resin sets, undergoing chemical transformation, heat is generated. If the resin is not thoroughly uniform in composition, localized reactions occur, generating heat which presets part of the resin, thereby imparting slight ripples to the surface. These ripples may have variations in the order of forty millionths of an inch, which are quite apparent to the naked eye. By agitating the liquid and having a vibration-free turntable on which the resin is rotated, surfaces of castings were produced without ripples noticeable to the naked eye. A simple method for causing agitation in paraboloid casting is to tip the axis of rotation slightly from the vertical by leaning the shaft 16 slightly to the vertical and therefore pan 28 will be inclined as it is perpendicular to the shaft 16. In the production of a paraboloid with a practical focal length (5 inches) the here-to-fore formula indicates that the pan must rotate one revolution per second and slower for longer focal lengths. This means that as the pan rotates the resin is continuously flowing toward the low point agitating the resin. If the axis of rotation is only slightly inclined to the vertical the paraboloidal surface is not distorted due to the force of gravity. The resin by continuously flowing eliminates local or point thermosetting of the resin since the generated heat is distributed evenly throughout the resin. A five degree variation from the vertical was found to be satisfactory. For flat or plane surface, agitation is applied by continuously raising a point on the periphery of the pan and slowly moving the raised point around the periphery.

What is claimed is:

A method for producing a highly accurate, cast paraboloidal surface comprising the steps of disposing a fluid epoxy resin in an open pan, rotating said pan about an axis which is inclined to a vertical line and which forms an angle of less than ten degrees with said vertical line while allowing said resin to harden, whereby a highly accurate hardened cast paraboloidal surface coaxial with said axis on which said pan is rotating is formed in said hardened epoxy resin.

References Cited in the file of this patent

UNITED STATES PATENTS

| | | |
|---|---|---|
| 7,702 | Holt | Oct. 8, 1850 |
| 669,119 | Krank | Mar. 5, 1901 |
| 1,363,143 | Miller | Dec. 21, 1920 |
| 2,221,695 | Robertson | Nov. 12, 1940 |
| 2,265,226 | Clewell et al. | Dec. 9, 1941 |
| 2,512,996 | Bixler | June 27, 1950 |
| 2,671,932 | Pique | Mar. 16, 1954 |
| 2,778,162 | Giffen | Jan. 22, 1957 |
| 2,826,869 | Lerch | Mar. 18, 1958 |
| 2,880,468 | Mooney et al. | Apr. 7, 1959 |